United States Patent Office 3,314,982
Patented Apr. 18, 1967

3,314,982
ORGANOSILICON COMPOUNDS
Götz Koerner, Mulheim (Ruhr), and Gerd Rossmy, Altendorf (Ruhr), Germany, assignors to Th. Goldsmidt A.-G., Essen, Germany
No Drawing. Filed May 3, 1963, Ser. No. 277,680
Claims priority, application Germany, May 5, 1962, G 34,907
17 Claims. (Cl. 260—448.2)

This invention generally relates to organosilicon compounds and is particularly concerned with novel alkylmercapto group containing silicon compounds and a process for their preparation, wherein the compounds contain the grouping ≡Si—M—SH, M representing a divalent hydrocarbon group which connects the silicon and sulphur atom through at least three carbon atoms.

It has previously been suggested to convert trimethylbromomethylsilane with thiourea into the corresponding isothiuronium salt. It is possible subsequently to convert a small portion of the isothiuronium salt into trimethylmethylmercaptosilane. This is accomplished with aqueous alkali. The yield in this process, however, is extremely low and amounts to about 25% of the theoretical amount only. In the event that the isothiuronium salt group is connected with the silicon atom of a polysiloxane through a single carbon atom only, the alkaline splitting or cleavage does not yield the desired mercaptan, but a polysiloxane is formed instead. This reaction has been investigated and described by S. Nozakura (Bull. Chem. Soc., Japan, 28, 1955, pp. 299–304). Nozakura observed the following reaction course:

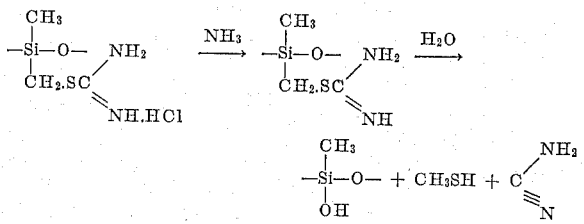

The siloxanol, which is primarily formed by splitting off of methylmercaptan and cynamide, condenses thereafter to form the corresponding siloxane. Thus, the Si—C linkage is split which results in the formation of a new Si—O—Si cross linking position. The entire sulphur is eliminated from the organosilicon compound.

It is a primary object of this invention to prepare organosilicon compounds containing alkylmercapto groups.

Another object of this invention is to provide a process for preparing alkylmercapto group containing organosilicon compounds which is simple to carry out and results in high yields.

Generally it is an object of this invention to improve on the art of organosilicon compounds and processes for their preparation.

Briefly, and in accordance with this invention, alkylmercapto group containing silicon compounds are obtained in high yield by cleaving in alkaline manner compounds containing the grouping ≡Si—M—X, wherein M is a divalent hydrocarbo ngroup which connects the silicon and sulphur atoms through at least three carbon atoms and wherein X is an isothiuronium salt group. The cleavage proceeds surprisingly smoothly, without side reactions, and high yields are obtained.

The isothiuronium salts not yet described in the literature serving as raw products are obtained by reacting products, which contain the grouping ≡Si—M—X, whereby M stands for a divalent hydrocarbon group as previously defined and X is a halogen radical, preferably chlorine, with thiourea at elevated temperatures. As solvents alcohols are used, for example ethanol, and also liquids being highly polar, e.g. dimethylformamide. Sodium iodide may be used as a catalyst. Often this preparation of isothiuronium salts is nearly quantative.

The inventive process may be carried out with compounds of the general formula $$R_b(R'O)_aSiMX \qquad (I)$$

In this formula, R and R' stand for same or different substituted or unsubstituted hydrocarbon groups. The hydrocarbon groups may belong to the alkyl-, alkaryl- or aralkyl-series. As examples the following are mentioned: methyl, ethyl, isoamyl, hexyl, phenyl and benzyl. M stands for a divalent hydrocarbon group as previously defined and is preferably $(CH_2)_3$.X is preferably isothiuronium chloride, while $a$ and $b$ indicate numerical values from 0 to 3, the total sum of $a$ and $b$ being equal to 3.

The inventive reaction proceeds about as follows:

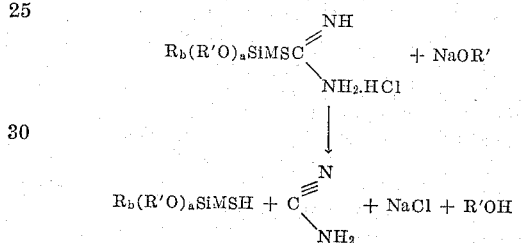

The mercaptan which is formed as a primary reaction product can be separated from the cynamide or the compounds formed therefrom by filtration and may be purified by distillation.

Preferred compounds to be produced in accordance with the inventive process are those wherein R is methyl or phenyl and R' is ethyl.

It will be obvious for a chemist skilled in this particular art that the reaction products which are obtained from the compounds of Formula I can be hydrolyzed and condensed to the corresponding mercaptoalkylsiloxanes. This may be accomplished with the addition of other silanes capable of hydrolysis. A pre-condition for such hydrolysis and condensation is, however, that $a$ is larger than 0.

The inventive process may, however, be directly carried out with polysiloxanes containing the grouping Si—M—X.

Thus, according to one embodiment of the invention the alkaline splitting may be carried out on compounds of the general formula

$$2-\left(\frac{n+m+v}{2}\right)$$

In this formula, R, R', X and M have the above-defined meaning; $n$ is any suitable number from 0 to 3; $m$ is any suitable number from 0 to 2; $v$ is any suitable number from 0.0001 to 1, preferably, however, 0.01 to 1; $(n+m+v)=1$ to 3. The formed polysiloxanes containing the mercaptoalkyl groups may be further modified and adapted to the particular use to which they are put, for example by equilibration reactions.

The inventive process can be carried out at relatively low temperatures, for example at room temperature. However, in many instances it is suitable to use higher temperatures, preferably temperatures of between 40 and 80° C. It is also advantageous to use an inert solvent such as dioxane, acetone and the like. This is particularly of advantage in the event that the starting compound has a relatively high viscosity.

The alkaline cleavage or splitting is preferably carried out in an aqueous medium. Alkali metal hydroxide or ammonium hydroxide may be used as base. It is also to be recommended that the cleavage is carried out with equimolecular quantities. In many instances, it is advantageous to operate in an alcoholic solution and to use the corresponding alcoholate as base. If the starting compound contains alkoxy groups OR', then it is recommended to select as solvent the corresponding alcohol R'OH so as to prevent side reactions. The isothiuronium salt may also be split with amines or gaseous ammonia.

The inventive products, due to the presence of the mercapto group, have a wide field of application and may be put to many uses. Thus, the mercaptans obtained from the compounds of Formulas I and II are suitable for the impregnation of protein containing materials such as, for example, wool and leather. Thus, for example, leather impregnated with the inventive compounds has a soft, pleasant feel and is water repellent.

Moreover the siloxanes and especially the silanes of this invention containing mercaptoalkyl groups may be used as finish for glass fibers, which are to be applied for reinforcing polyester resins or epoxyd resins. By this procedure a considerable improvement of the adhesive strength is obtained.

Silanes or siloxanes which contain mercapto groups exhibit also important cosmetic properties. Thus for example, they may advantageously be used for the treatment of hair. In permanent wave processes, such compounds may be incorporated into the structure of the hair through disulfide bridges. Hair which has been treated in such manner is imparted with a permanent softness and can be easily styled and shaped. For hair treatment purposes, it is of importance that the isothiuronium salt is converted into the corresponding mercaptan in situ only; that is, the conversion takes place only at the time and location where the hair treatment actually is carried out. For this purpose, the isothiuronium salt containing compound is used which has no appreciable odor and any offensive odor during the treatment is therefore practically avoided. This, of course, is particularly advantageous in the preparation of cosmetic materials.

The invention will now be described by several examples, it being understood, however, that these examples are given by way of illustration and not by way of limitation and that many changes in the choice of raw materials and process conditions in general may be effected without affecting in any way the scope and spirit of the invention as recited in the appended claims.

EXAMPLE I

*Preparation of γ-mercaptopropylmethyldiethoxysilane*

The starting material is 3-(methyldiethoxysilyl)- propylisothiuroniumchloride. This compound is produced as follows:

A mixture of 76.1 grams (1 mole) of thiourea, 0.6 gram of sodium iodide, 210.5 grams (1 mole) of γ-chloropropyldiethoxysilane and 300 ml. of ethanol are heated to boiling under reflux and agitation for fifteen hours. The entire amount of thiourea dissolves and does not crystallize even if the reaction mixture is cooled. The ethanol is thereafter removed by distillation at reduced pressure. A highly viscous mass remains. This compound contains 12.34% of ionogenic chlorine, while the theoretical amount would be 12.30%.

The compound obtained is 3 - (methyldiethoxysilyl)- propylisothiuroniumchloride. The compound is mixed under stirring with a solution of 300 ml. of ethanol containing 23 grams (1 gram atom) of sodium in the form of the sodiumethylate. The mixture is then heated to boiling for 2½ hours under reflux and is thereafter subjected to filtration. The residue is washed with ethyl alcohol, the ethanolic solutions are combined and are freed from the solvent. The residue is subjected to fractional distillation in vacuo. 160 grams of γ-mercaptopropylmethyldiethoxysilane are obtained. This amount corresponds to 77% of the theoretical amount (BP$_{12}$ 95–100° C.).

*Analysis.*—Theoretical amount: Si, 13.46; C, 46.14; H, 9.65; S, 15.38; mol. weight, 208. Actual amount: Si, 12.9; C, 46.8; H, 10.0; S, 15.1; mol. weight, 205.

EXAMPLE II

*Preparation of γ-mercaptopropyltriethoxysilane*

A mixture of 76.1 grams (1 mole) of thiourea, 0.6 gram of sodium iodide, 240.5 grams of γ-chloropropyltriethoxysilane and 200 ccm. of absolute alcohol are boiled for twenty hours under reflux and agitation. The reaction product is cooled on an ice bath. No precipitation of unreacted thiourea could be observed. A vigorous dry flow of ammonia is introduced into the reaction mixture under stirring until no further precipitation can be observed and the mixture is saturated with ammonia. The precipitated ammonium chloride is removed by filtration, is washed with ethanol and the combined ethanolic solutions are distilled through a column. In the final stages, the distillation is effected in vacuo. (BP$_{14}$ 112–115° C., yield 159.5 grams, which corresponds to 67% of the theory.)

EXAMPLE III

Preparation of a polysiloxane of the formula

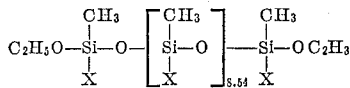

X=75% CH$_3$, 25% CH$_2$CH$_2$CH$_2$SH.

A polysiloxane of the above indicated formula is produced according to the procedure described in U.S. patent application Ser. No. 168,833, now U.S. Patent No. 3,183,254 by reacting dimethyldichlorosilane and γ-chloropropylmethyldichlorosilane. In the above-indicated formula, 75% of X consists of CH$_3$ groups while 25% consists of CH$_2$CH$_2$CH$_2$Cl groups. 241.3 grams (0.24 mole) of this polysiloxane are stirred for forty hours at a bath temperature of 90° C. with 45.6 grams (0.633 mole) of thiourea, 0.4 gram of sodium iodide and 43 grams of absolute ethanol.

The ionogenic chlorine content amounts now to 6.4%. The isothiuronium salt of the above formula is theoretically calculated to amount to 6.61%, X=75% of CH$_3$ and 25% of

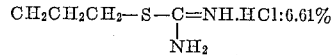

An additional amount of 250 ccm. of absolute alcohol is added to the reaction mixture, whereafter a vigorous stream of dry ammonia is introduced until no further ammonium chloride precipitates and the mixture is saturated with ammonia. The product is then filtered, the alcohol is removed by distillation (in the final stages in vacuo) and the remaining oil is again filtered.

*Analysis.*—Actual amount: Si, 29.30; C, 35.0; H, 8.3; S, 7.55. Theoretical amount: Si, 29.17; C, 35.99; H, 8.28; S, 8.35.

EXAMPLE IV

*γ-Mercapto-β-methylpropylmethyldiethoxysilane*

According to Example II 76.1 grams (1 mole) of thiourea are reacted with 0.6 gram of sodium iodide and 224.5 grams (1 mole) of γ-chloro-β-methylpropylmethyldiethoxysilane. The alkaline cleavage of the isothiuronium compound thus formed is effected as described in Example II. $BP_{10}$ 105–108° C., yield 172 grams, which corresponds to 77.5% of the theory.

EXAMPLE V

*γ-Mercapto-β-methylpropyltriethoxysilane*

According to Example II 76.1 grams (1 mole) of thiourea are reacted with 0.6 gram of sodium iodide and 254.5 grams (1 mole) of γ-chloro-β-methylpropyltriethoxysilane. The subsequent cleavage of the isothiuronium compound thus formed is effected as described in Example II. $BP_{10}$ 120–125° C., yield 182 grams, which corresponds to 72.3% of the theory.

EXAMPLE VI

*δ-Mercaptobutyltriethoxysilane*

A mixture of 76.1 grams (1 mole) of thiourea, 0.6 gram of sodium iodide, 254.5 grams (1 mole) of δ-chlorobutyltriethoxysilane and 200 ccm. of anhydrous dimethylformamide is heated to boiling under reflux and agitation for 20 hours, the dimethylformamide is distilled off (in the final stages in vacuo) and the residue is solved in 300 ccm. ethanol. While stirring dry $NH_3$ gas is then introduced until no further ammonium chloride precipitates and the mixture is saturated with ammonia. The reaction product is filtered, the residue washed with ethanol and the ethanolic solutions are combined. Distillation is effected through a column. $BP_{10}$ 127–130° C., yield 166 grams, which corresponds to 66% of the theory.

EXAMPLE VII

*γ-Mercaptopropylphenyldimethoxysilane*

According to Example II 76.1 grams (1 mole) of thiourea are reacted with 0.6 gram of sodium iodide and 244.5 grams (1 mole) of γ-chloropropylphenyldimethoxysilane. The subsequent alkaline cleavage of the isothiuronium compound thus formed is effected as described in Example II. $BP_{10}$ 156–160° C., yield 195 grams, which corresponds to 80.5% of the theory.

EXAMPLE VIII

*Tetra-γ-mercaptopropyl-tetramethyltetrasiloxane*

A mixture of 136.5 grams (0.25 mole) of tetra-γ-chloropropyl-tetramethyltetrasiloxane, 76.1 grams (1 mole) of thiourea, 0.6 gram of sodium iodide and 200 ccm. of ethanol is stirred for 30 hours under reflux and agitation. The reaction product is mixed with 700 ccm. of water whereafter concentrated ammonia is introduced until the solution is considerably ammoniacal and shows no precipitation of oil upon further addition of ammonia. After addition of benzene water is removed from the separated oil by azeotropic distillation. The benzene is again removed by distillation and the residue is then filtered. Yield 110 grams, which corresponds to 82% of the theory of tetra-γ-mercaptopropyl-tetramethyl-tetrasiloxane.

*Analysis.*—Actual amount: Si, 20.6%; C, 35.72%, H, 7.41%; S, 23.2%. Theoretical amount: Si, 20.89%; C, 35.83%; H, 7.46%; S, 23.88%.

While specific embodiments of the invention have been described in detail to illustrate the application of the principles of the invention, it will be understood that this invention may be embodied otherwise without departing from such principles.

What is claimed is:

1. A process for preparing organosilicon compounds containing the grouping =Si—M—SH wherein M is a divalent hydrocarbon group which connects the silicon and sulphur atoms through a chain of three alkylene carbon atoms, which comprises subjecting a compound of the average formula $R_b(R'O)_a SiMX$, wherein M has the above meaning, X is an isothiuronium halide, R and R' are each selected from the group consisting of alkyl and aryl and $a$ and $b$ are average numerical values defined by $b = 0–2$
$a = 1–3$, and
$a + b = 3$, to alkaline cleavage.

2. A process as claimed in claim 1 wherein the alkaline cleavage is performed at a temperature of between about 40 to 80° C.

3. A process as claimed in claim 1, wherein the alkaline cleavage is carried out in an aqueous medium.

4. A process as claimed in claim 1, wherein the alkaline cleavage is carried out in an alcoholic medium.

5. A process as claimed in claim 1, wherein the alkaline cleavage is carried out with ammonia gas.

6. A process as claimed in claim 1, wherein the alkaline cleavage is carried out with an alkali metal alcoholate.

7. A process as claimed in claim 1, wherein the isothiuronium halide is an isothiuronium chloride.

8. A process as claimed in claim 1, wherein M is $(CH_2)_3$.

9. A process for preparing organosilicon compounds containing the grouping =Si—M—SH wherein M is a divalent hydrocarbon group which connects the silicon and sulphur atoms through a chain of three alkylene carbon atoms, which comprises subjecting a compound of the average formula $$R_n(OR')_m(MX)_v SiO_{2-\left(\frac{n+m+v}{2}\right)}$$

wherein

M has the above meaning,
X is an isothiuronium halide,
R and R' are each selected from the group consisting of alkyl and aryl, and $n$, $m$ and $v$ are average numerical values defined by $n = 0–2.999$
$m = 0–2$
$v = 0.001–1$, and
$(n+m+v) = 1–3$, to alkaline cleavage.

10. A process as claimed in claim 9, wherein $v$ has a numerical value from 0.01 to 1.

11. A process as claimed in claim 9, wherein the alkaline cleavage is performed at a temperature of between about 40 to 80° C.

12. A process as claimed in claim 9, wherein the alkaline cleavage is carried out in an aqueous medium.

13. A process as claimed in claim 9, wherein the alkaline cleavage is carried out in an alcoholic medium.

14. A process as claimed in claim 9, wherein the alkaline cleavage is carried out with ammonia gas.

15. A process as claimed in claim 9, wherein the alkaline cleavage is carried out with an alkali metal alcoholate.

16. A process as claimed in claim 9, wherein the isothiuronium halide is an isothiuronium chloride.

17. A process as claimed in claim 9, wherein M is $(CH_2)_3$.

(References on following page)

References Cited by the Examiner

UNITED STATES PATENTS
2,719,165  9/1955  Cooper _____ 260—448.2

FOREIGN PATENTS
1,000,817  1/1957  Germany.

OTHER REFERENCES

Burkhard: "Jour. American Chem. Soc.," vol. 72, March 1950, pp. 1078–80.

Bonsignore et al.: "Jour. Org. Chem.," vol. 25, February 1960, pp. 237–40.

Cooper II: "Jour. Am. Chem. Soc.," vol. 76, 1954, p. 2500.

Gilman et al.: "Jour Am Chem. Soc.," vol. 75, 1953, pp. 3760–2.

Marvel et al.: "Jour. Polymer Science," vol. 9, 1952, pp. 53–60.

Mironov et al.: "Izvestia Akad. Nauk. SSSR," 1959, pp. 85–90 (53 Chem. Abstracts 15955–6 (1959).

Nozakura: "Bull. Chem. Soc. Japan," vol. 28, 1955, pp. 299–304 (52 Chem. Abstracts 3667 (1958)).

Sakata et al.: 54 Chem. Abstracts 357–8 (1960).

TOBIAS E. LEVOW, *Primary Examiner.*

SAMUEL H. BLECH, *Examiner.*

P. F. SHAVER, *Assistant Examiner.*

UNITED STATES PATENT OFFICE

CERTIFICATE OF CORRECTION

Patent No. 3,314,982                April 18, 1967

Götz Koerner et al.

It is hereby certified that error appears in the above numbered patent requiring correction and that the said Letters Patent should read as corrected below.

In the heading to the printed specification, lines 4 and 5, for "Th. Goldsmidt A.-G." read -- Th. Goldschmidt A.-G. --.

Signed and sealed this 9th day of January 1968.

(SEAL)
Attest:

Edward M. Fletcher, Jr.            EDWARD J. BRENNER

Attesting Officer                 Commissioner of Patents